(12) United States Patent
Yuan et al.

(10) Patent No.: US 12,085,474 B2
(45) Date of Patent: Sep. 10, 2024

(54) APPARATUS AND METHOD FOR MEASURING MICRO-VIBRATION INFLUENCE OF SPATIAL ORIENTATION MEASURING INSTRUMENT

(71) Applicant: BEIJING INSTITUTE OF CONTROL ENGINEERING, Beijing (CN)

(72) Inventors: Li Yuan, Beijing (CN); Li Wang, Beijing (CN); Lin Li, Beijing (CN); Ran Zheng, Beijing (CN); Yanpeng Wu, Beijing (CN); Jun Zhong, Beijing (CN); Jie Sui, Beijing (CN); Yuming Li, Beijing (CN); Miaomiao Wang, Beijing (CN); Huiyan Cheng, Beijing (CN); Xiaoyan Wang, Beijing (CN)

(73) Assignee: BEIJING INSTITUTE OF CONTROL ENGINEERING, Beijing (CN)

( * ) Notice: Subject to any disclaimer, the term of this patent is extended or adjusted under 35 U.S.C. 154(b) by 176 days.

(21) Appl. No.: 17/917,272

(22) PCT Filed: Jun. 24, 2021

(86) PCT No.: PCT/CN2021/102015
§ 371 (c)(1),
(2) Date: Oct. 6, 2022

(87) PCT Pub. No.: WO2022/088713
PCT Pub. Date: May 5, 2022

(65) Prior Publication Data
US 2023/0175921 A1 Jun. 8, 2023

(30) Foreign Application Priority Data
Oct. 27, 2020 (CN) .......................... 202011164958.6

(51) Int. Cl.
G01M 7/06 (2006.01)
G01M 7/02 (2006.01)
G01M 11/08 (2006.01)

(52) U.S. Cl.
CPC ............ *G01M 11/08* (2013.01); *G01M 7/022* (2013.01); *G01M 7/06* (2013.01)

(58) Field of Classification Search
CPC ...... G01M 11/08; G01M 11/02; G01M 7/022; G01M 7/06; G01M 7/08; G01M 7/027; G01C 21/025; G01C 25/00
See application file for complete search history.

(56) References Cited

U.S. PATENT DOCUMENTS

2004/0145713 A1* 7/2004 Ono ..................... G03F 7/70716
355/53
2017/0160166 A1* 6/2017 Matsumoto ............. G01M 7/06

FOREIGN PATENT DOCUMENTS

CN 102650563 A 8/2012
CN 102735264 A 10/2012
(Continued)

OTHER PUBLICATIONS

Wu, Yong-liang et at. "Study on the Standard for Spacecraft Micro-vibration Testing Method". China Academic Journal Electronic Publishing House: Sep. 2019, pp. 198-203.
(Continued)

*Primary Examiner* — Suman K Nath
(74) *Attorney, Agent, or Firm* — Harness, Dickey & Pierce, P.L.C.

(57) ABSTRACT

A device and a method for determining a microvibration effect on a millisecond-level space optical sensor are provided. The device includes: a light source, a star simulator, an air flotation vibration isolation platform, a suspension system/air flotation system, a zero stiffness system, a supporting system, a six-degree-of-freedom microvibration
(Continued)

simulator, a signal driving apparatus, and a data acquisition and processing system. In the device for determining a microvibration effect on a space pointing measurement apparatus, a free boundary condition and a zero gravity environment are simulated by using a suspension system and a zero stiffness system. A light source and a star simulator simulate a star at infinity. A six-degree-of-freedom microvibration simulator simulates an on-orbit microvibration mechanical environment which is used as an input of a test. Extremely high-precision sensors collect system response data.

10 Claims, 3 Drawing Sheets

(56) References Cited

FOREIGN PATENT DOCUMENTS

| | | |
|---|---|---|
| CN | 102798459 A | 11/2012 |
| CN | 104266811 A | 1/2015 |
| CN | 111157208 A | 5/2020 |
| CN | 112504595 A | 3/2021 |
| JP | 2011213313 A | 10/2011 |

OTHER PUBLICATIONS

International Search Report (English and Chinese) and Written Opinion of the International Searching Authority (Chinese) issued in PCT/CN2021/102015, mailed Aug. 8, 2022; ISA/CN.

* cited by examiner

APPARATUS AND METHOD FOR MEASURING MICRO-VIBRATION INFLUENCE OF SPATIAL ORIENTATION MEASURING INSTRUMENT

The present application is the national phase of International Patent Application No. PCT/CN2021/102015, titled "APPARATUS AND METHOD FOR MEASURING MICRO-VIBRATION INFLUENCE OF SPATIAL ORIENTATION MEASURING INSTRUMENT", filed on Jun. 24, 2021, which claims priority to Chinese Patent Application No. 202011164958.6, titled "APPARATUS AND METHOD FOR MEASURING MICRO-VIBRATION INFLUENCE OF SPATIAL ORIENTATION MEASURING INSTRUMENT", filed on Oct. 27, 2020 with the Chinese Patent Office, both of which are incorporated herein by reference in their entireties.

FIELD

The present disclosure relates to the field of extremely high-precision space pointing measurement technology, space remote sensing, star sensors, and high-performance optical instruments related to astronomy, aviation and the like, and in particular to a device for determining a microvibration effect on a millisecond-level space optical sensor.

BACKGROUND

Space optical sensor is an important part or type of a spacecraft. With the space optical sensor, a target (that is, a celestial body, such as the earth, a star and a planet) in a optical band can be observed to obtain a gesture and orbital parameters of a spacecraft, a state and evolution information of a target celestial body, or the like. Due to the high accuracy of the millisecond-level optical sensor and the high sensitivity of the system, a small disturbance (hereinafter referred to as "microvibration"), that is ignored in the past and generated by a spacecraft normally operating in an orbit, will seriously affect measurement accuracy of a gesture measurement system, thereby affecting the stability of the spacecraft and even directly affecting the operation quality of the spatial optical sensitivity.

In order to determine the operation performance of the millisecond-level space optical sensor in a microvibration environment and prepare for the subsequent suppression of the microvibration, a device for determining a microvibration effect on a millisecond-level space optical sensor is provided. With the device, the operation performance and accuracy index of the millisecond-level space optical sensor in the microvibration environment and a microvibration sensitive frequency range of the millisecond-level space optical sensor can be effectively obtained, thereby providing a reference for a calibration error of the whole machine.

SUMMARY

To overcome the defects in the conventional technology, a device for determining a microvibration effect on a millisecond-level space optical sensor is provided according to the present disclosure. The device is applied to practical engineering applications.

The principle of the present disclosure is described as follows. In a device for determining a microvibration effect on a space pointing measurement apparatus, a free boundary condition and a zero gravity environment are simulated by using a suspension system and a zero stiffness system. A light source and a star simulator simulate a star at infinity. A six-degree-of-freedom microvibration simulator simulates an on-orbit microvibration mechanical environment which is used as an input of a test. An extremely high-precision sensor collects system response data. With the device according to the present disclosure, a microvibration effect on a millisecond-level space optical sensor is determined, and system sensitive parameters are determined based on data.

The following technical solutions are provided according to the present disclosure. A device for determining a microvibration effect on a space pointing measurement apparatus includes: a light source, a star simulator, an air flotation vibration isolation platform, a suspension system/ air flotation system, a zero stiffness system, a supporting system, a six-degree-of-freedom microvibration simulator, a signal driving apparatus, and a data acquisition and processing system. The star simulator is fixedly connected to the air floating vibration isolation platform. The six-degree-of-freedom microvibration simulator is connected to the zero stiffness system via the supporting system. The zero stiffness system is connected to the suspension system/air flotation system. The space pointing measurement apparatus to be tested is suspended and fixed on a working platform of the six-degree-of-freedom microvibration simulator. A center line of the light source, a center line of the star simulator and a center line of the space pointing measurement apparatus to be tested are arranged to be on a same straight line. The light source and the star simulator are configured to simulate a star at infinity. The suspension system/air floating system and the zero stiffness system are configured to simulate a free boundary condition and a zero gravity environment. The signal driving device is configured to generate a control signal according to a predetermined test requirement and transmit the control signal to the six-degree-of-freedom microvibration simulator. The six-degree-of-freedom microvibration simulator is configured to generate a microvibration signal corresponding to the control signal to simulate an on-orbit microvibration mechanical environment. The space pointing measurement apparatus to be tested is connected to the data acquisition and processing system via a cable to collect and store response data from a target position in test and perform signal transmission.

In an embodiment, an acceleration sensor is arranged on the supporting system. An acceleration sensor is arranged on each of an upper surface and a lower surface of the six-degree-of-freedom microvibration simulator. An acceleration sensor is arranged at an installation interface of the space pointing measurement apparatus to be tested. An acceleration sensor and an angular displacement sensor are arranged on an optical element of the space pointing measurement apparatus to be tested.

In an embodiment, each of acceleration sensors has a mass not more than 10 g, is capable of measuring a gravitational acceleration for 0.001 g and has a resolution better than 0.5 mg. The angular displacement sensor has a mass not more than 10 g and a resolution better than 3 milliseconds.

In an embodiment, a displacement sensor is arranged on an installation surface of each of acceleration sensors, and the displacement sensor has a resolution better than 2 microns.

In an embodiment, three-dimension first-order frequencies of the zero stiffness system are configured to be less than 0.05 Hz, and three-dimension first-order frequencies of the supporting system are configured to be not less than 2 Khz.

In an embodiment, the six-degree-of-freedom microvibration simulator has a six-degree-of-freedom decoupling capability, and is capable of driving an acceleration of a 0.001 g level in a range of 0 kHz to 1 kHz.

In an embodiment, the air flotation system has an adjustable and stable air pressure for a long time. A surface of the air flotation system connected to the supporting system has a flatness better than 3 um. The air flotation system has an air flotation stiffness better than 20 Hz.

In an embodiment, the star simulator is connected and fixed with the air floating platform through a three-point positioning support structure, and positions of three points of the three-point positioning support structure are distributed axisymmetrically.

In an embodiment, the space pointing measurement apparatus to be tested is a millisecond-level optical sensor.

A method for determining a microvibration effect on a space pointing measurement apparatus includes: step (1), establishing the device in a million-level ultra-clean laboratory and checking connection safety; step (2), turning on the light source, powering on the data acquisition and processing system, and performing environment background noise test by using the sensor, where a data acquisition frequency is not less than 5 kHz, and an acquisition time period of steady-state data is not less than 30 seconds; step (3), analyzing collected background noise, counting collected time-domain data, performing FFT transformation to obtain frequency-domain data, analyzing the frequency-domain data to obtain amplitude-frequency features of the background noise, proceeding to step (4) in a case that the amplitude-frequency features of the background noise meet a requirement, and proceeding to step (1) for inspection in a case that the amplitude-frequency features of the background noise do not meet a requirement; step (4), powering on the signal driving apparatus to drive the six-degree-of-freedom microvibration simulator to perform disturbance driving with different amplitudes in a range of 0 kHz to 1 kHz, and performing data acquisition and storage by the data acquisition and processing system, where the data acquisition frequency is not less than 5 kHz, and an acquisition time of each segment of steady-state data is not less than 60 seconds, at least 10 segments of steady-state data are collected, and the space pointing measurement apparatus to be tested is powered on and does not operate in a first test process; step (5), analyzing the data collected in step (4), counting collected time-domain data, and performing FFT transformation to obtain frequency-domain data, analyzing the frequency-domain data, and obtaining an amplitude-frequency feature diagram of the data collected by the sensor; step (6), powering on the space pointing measurement apparatus to be tested to operate for imaging, and performing steps (4) and (5); step (7), shutting down the space pointing measurement apparatus to be tested, and performing steps (4) and (5); and step (8), after test, stopping transmitting operation instructions to a to-be-tested object and a testing device, and then powering off the to-be-tested object and the testing device.

Compared with the conventional technology, the present disclosure has the following advantages.

According to the present disclosure, a device for determining a microvibration effect on a millisecond-level space optical sensor is provided. (a) The suspension system and the zero stiffness system can block the effect of external noise and interference, and simulate the on-orbit free boundary condition and the zero gravity environment. (b) A six-degree-of-freedom microvibration can be inputted to the millisecond optical apparatus. (c) The imaging process and the image acquisition and storage process of the millisecond-level optical apparatus in a microvibration environment can be performed. (d) Imaging evaluation can be performed on the effect in the microvibration environment based on an imaging result. (e) The extremely high-precision sensor can obtain the microvibration response magnitude acquisition and storage of the millisecond-level optical sensor, thereby testing the transfer function of the system in the microvibration environment.

DETAILED DESCRIPTION OF EMBODIMENTS

Figure 1:
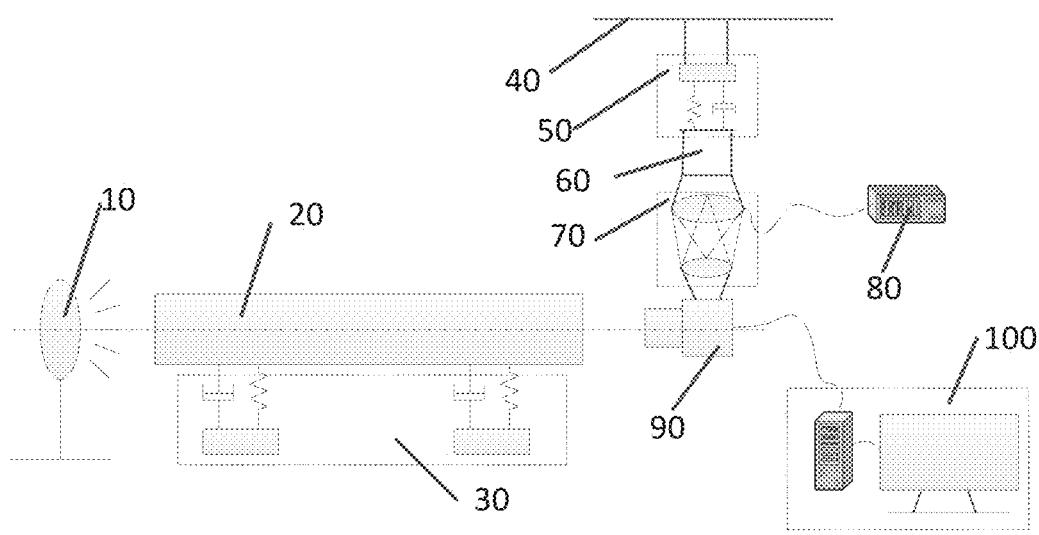
FIG. 1 is a schematic diagram showing a suspension implementation according to the principle of the present disclosure.

Hereinafter, the present disclosure is described in detail with reference to FIG. 1, FIG. 2 and specific embodiments.

A device for determining a microvibration effect on a millisecond-level space optical sensor includes: a light source 10, a star simulator 20, an air flotation vibration isolation platform 30, a suspension system/air flotation system 40, a zero stiffness system 50, a supporting system 60, a six-degree-of-freedom microvibration simulator 70, a signal driving apparatus 80, a millisecond-level optical sensor 90, and a data acquisition and processing system 100.

The suspension system 40 usually includes N (N is a multiple of 2 or 3, and is not less than 3) steel wire ropes with equal stiffness, so as to keep the test system stable and not roll over in a suspension process. The manner in which both ends of the steel wire ropes are fixed may be designed according to requirements.

The zero stiffness system 50 is arranged with an acceleration sensor 501. An acceleration sensor 701 is arranged on an upper surface of the six-degree-of-freedom microvibration simulator 70, and an acceleration sensor 702 is arranged on a lower surface of the six-degree-of-freedom microvibration simulator 70. An acceleration sensor 901 is arranged at an installation interface of the millisecond-level optical sensor 90, an acceleration sensor 902 is arranged on an optical element of the millisecond-level optical sensor 90, and an angular displacement sensor 903 is arranged on the optical element. Each of the acceleration sensors 501, 701, 702, 901 and 902 has a mass not more than 10 g, is capable of measuring a gravitational acceleration for 0.001 g, and has a resolution better than 0.5 mg. The angular displacement sensor 903 has a mass not more than 10 g and a resolution better than 3 milliseconds. A displacement sensor is arranged on an installation surface of each of the acceleration sensors, and the displacement sensor has a resolution better than 2 microns. The displacement sensor, such as a laser displacement meter, may perform indirect measurement.

Three-dimension first-order frequencies of the zero stiffness system 50 are less than 0.05 Hz. The zero stiffness system 50 may be replaced by the conventional quasi-zero-stiffness system having system stiffness not greater than 0.1 Hz. Three-dimension first-order frequencies of the supporting system 60 are not less than 2 KHz. The supporting system 60 is integrally formed with a high-strength metal material. A mounting flange is arranged at each of two ends of the supporting system 60 for connecting the zero stiffness system 50 and the six-degree-of-freedom microvibration simulator 70. The flange may be designed according to requirements, and the connection strength should be guaranteed. Except for screws and bolts, fasteners between different systems include pins for positioning, and the diameters of the pins are not less than 4) The six-degree-of-freedom microvibration simulator 70 has a six-degree-of-freedom decoupling capability, that is, the degrees of freedom in X, Y and Z motion directions are not coupled with stiffness of the degrees of freedom in X, Y and Z rotation directions. The six-degree-of-freedom microvibration simulator 70 may be implemented by using the conventional PI hexapod platform, and the six-degree-of-freedom microvibration simulator 70 should be capable of driving an acceleration of a 0.001 g level in a range of 0 kHz to 1 kHz. The six-degree-of-freedom microvibration simulator 70 may be replaced by the conventional fixed-frequency vibration exciter for integrating and processing different frequency data after excitation tests with different frequencies. Axes of the light source 10, the star simulator 20 and the millisecond-level optical sensor 90 are arranged to be on a same straight line. The air flotation vibration isolation platform 30 has an air-floating vibration isolation capability and has an adjustable air pressure.

In a case that the suspension system (or the air flotation system) 40 is an flotation system, the air flotation system has a flatness better than 3 um and an air flotation stiffness better than 20 Hz, and the air flotation system has an adjustable and stable air pressure for a long time.

The device for determining a microvibration effect on a millisecond-level space optical sensor operates in a million-level ultra-clean laboratory.

The device for determining a microvibration effect on a millisecond-level space optical sensor may be applied to high-performance satellites, aerial remote sensors, near-space vehicles, astronomical observation, civil precision optical devices, and fields such as experiments and tests involving extremely high-precision optical microvibration.

The test process includes the following steps (1) to (10).

Figure 2:
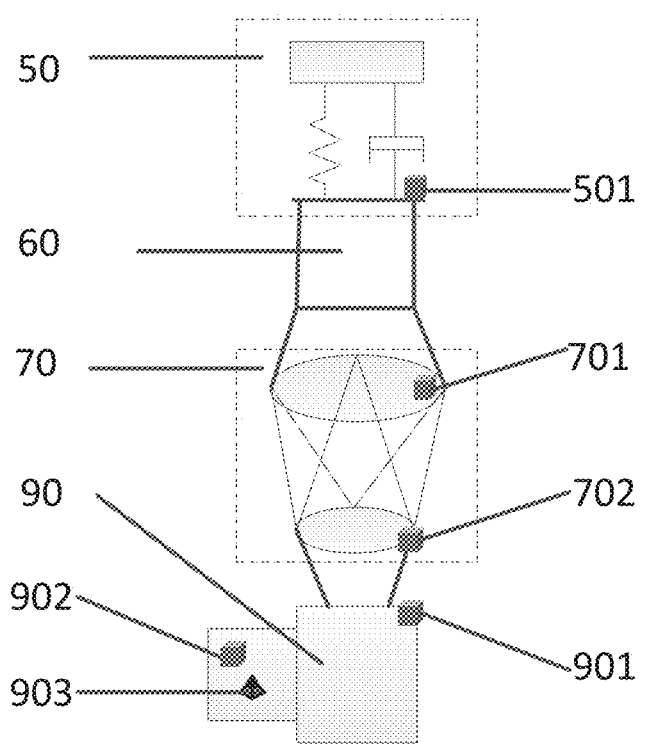
FIG. 2 is a schematic diagram showing positions of sensors in the suspension implementation according to the principle of the present disclosure.
Figure 3:
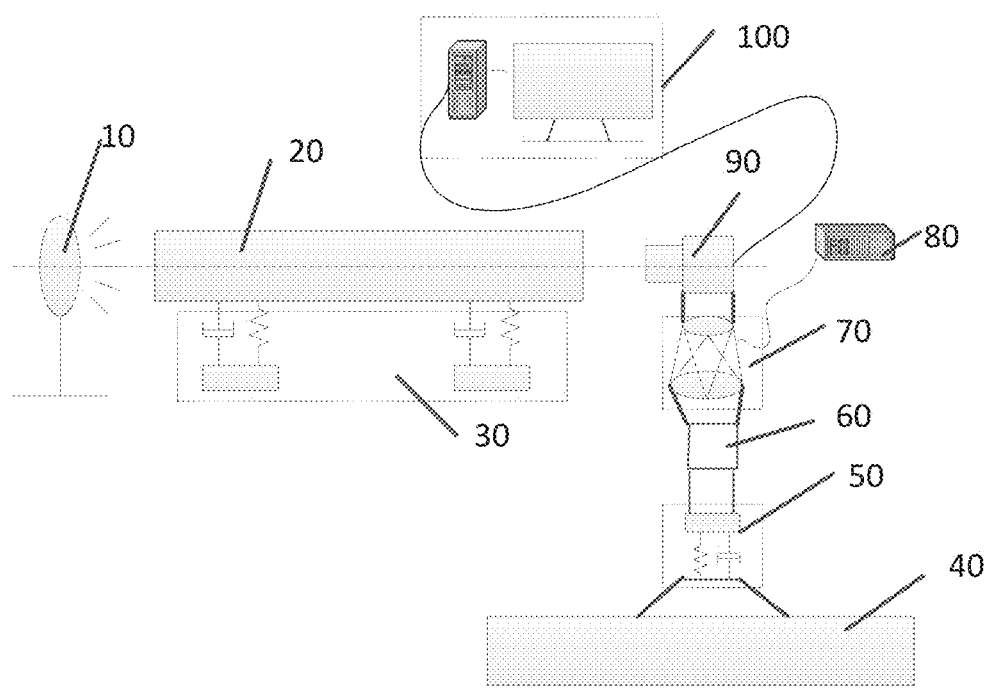
FIG. 3 is a schematic diagram showing an air flotation implementation according to the principle of the present disclosure.

In step (1), a test system as shown in FIG. 1 is established in a million-level ultra-clean laboratory, and connection safety is checked. There should be no artificial noise, such as people walking around, in the environment during the test process.

In step (2), the light source 10 is turned on, and the data acquisition and processing system 100 is powered on. Environment background noise test is performed by using the acceleration sensors 701, 702, 901 and 902, and the angular displacement sensor 903 or the displacement sensor in the system. The data acquisition frequency is not less than 5 kHz, and an acquisition time period of steady-state data is not less than 30 seconds.

In step (3), collected background noise is analyzed. Collected time-domain data are counted, and FFT transformation is performed to obtain frequency-domain data. The frequency-domain data is analyzed to obtain amplitude-frequency features of the background noise. Proceed to step (4) in a case that the amplitude-frequency features of the background noise meet a requirement. Proceeding to step (1) for inspection in a case that the amplitude-frequency features of the background noise do not meet a requirement.

In step (4), the signal driving apparatus 80 is powered on to drive the six-degree-of-freedom microvibration simulator 70 to perform disturbance driving with different amplitudes in a range of 0 kHz to 1 kHz. The data acquisition and processing system 100 performs data acquisition and storage. The data acquisition frequency is not less than 5 kHz, and an acquisition time of each segment of steady-state data is not less than 60 seconds, and at least 10 segments of steady-state data are collected. In the test process, the millisecond-level optical sensor 90 is powered on and does not operate.

In step (5), the data collected in step (4) is analyzed. Collected time-domain data is counted. FFT transformation is performed to obtain frequency-domain data, and the frequency-domain data is analyzed. An amplitude-frequency feature diagram, usually expressed in a form of a waterfall diagram, of the data collected by the sensor is finally obtained.

In step (6), step (4), in which the millisecond-level optical sensor 90 is powered on and operates for imaging, is performed.

In step (7), the data collected in step (6) is analyzed. Collected time-domain data is counted. FFT transformation is performed to obtain frequency-domain data, and the frequency-domain data is analyzed. An amplitude-frequency feature diagram, usually expressed in a form of a waterfall diagram, of the data collected by the sensor is finally obtained.

In step (8), step (4), in which the millisecond-level optical sensor 90 is powered off, is performed.

In step (9), the data collected in step (8) is analyzed. Collected time-domain data is counted. FFT transformation is performed to obtain frequency-domain data, and the frequency-domain data is analyzed. An amplitude-frequency feature diagram, usually expressed in a form of a waterfall diagram, of the data collected by the sensor is finally obtained.

In step (10), after the test process, operation instructions is stopped to be transmitted to a to-be-tested object and a testing device, and then the to-be-tested object and the testing device are powered off.

The parts which are not described in detail in the present disclosure are common knowledge to those skilled in the art.

The invention claimed is:

1. A device for determining a microvibration effect on a space pointing measurement apparatus, comprising: a light source, a star simulator, an air flotation vibration isolation platform, a suspension system/air flotation system, a zero stiffness system, a supporting system, a six-degree-of-freedom microvibration simulator, a signal driving apparatus, and a data acquisition and processing system, wherein the star simulator is fixedly connected to the air floating vibration isolation platform; the six-degree-of-freedom microvibration simulator is connected to the zero stiffness system via the supporting system; the zero stiffness system is connected to the suspension system/air flotation system; the space pointing measurement apparatus to be tested is suspended and fixed on a working platform of the six-degree-of-freedom microvibration simulator; a center line of the light source, a center line of the star simulator and a center line of the space pointing measurement apparatus to be tested are arranged to be on a same straight line; the light source and the star simulator are configured to simulate a star at infinity, and the suspension system/air floating system and the zero stiffness system are configured to simulate a free boundary condition and a zero gravity environment;

the signal driving device is configured to generate a control signal according to a predetermined test requirement and transmit the control signal to the six-degree-of-freedom microvibration simulator, and the six-degree-of-freedom microvibration simulator is configured to generate a microvibration signal corresponding to the control signal to simulate an on-orbit microvibration mechanical environment; and the space pointing measurement apparatus to be tested is connected to the data acquisition and processing system via a cable to collect and store response data from a target position in test and perform signal transmission.

2. The device according to claim 1, wherein a first acceleration sensor is arranged on the supporting system, a second acceleration sensor is arranged on each of an upper surface and a lower surface of the six-degree-of-freedom microvibration simulator, a fourth acceleration sensor is arranged at an installation interface of the space pointing measurement apparatus to be tested, and a fifth acceleration sensor and an angular displacement sensor are arranged on an optical element of the space pointing measurement apparatus to be tested.

3. The device according to claim 2, wherein each of the first acceleration sensors to the fifth acceleration sensor has a mass not more than 10 g, is capable of measuring a gravitational acceleration for 0.001 g and has a resolution better than 0.5 m·g, and the angular displacement sensor has a mass not more than 10 g and a resolution better than 3 milliseconds.

4. The device according to claim 2, wherein a displacement sensor is arranged on an installation surface of each of the first acceleration sensor to the fifth acceleration sensor, and the displacement sensor has a resolution better than 2 microns.

5. A method for determining a microvibration effect on a space pointing measurement apparatus, comprising:

step (1), establishing the device according to claim 2 in a million-level ultra-clean laboratory and checking connection safety;

step (2), turning on the light source, powering on the data acquisition and processing system, and performing environment background noise test by using the first acceleration sensor to the fifth acceleration sensor and the angular displacement sensor, wherein a data acquisition frequency is not less than 5 kHz, and an acquisition time period of steady-state data is not less than 30 seconds;

step (3), analyzing collected background noise, counting collected time-domain data, performing FFT transformation to obtain frequency-domain data, analyzing the frequency-domain data to obtain amplitude-frequency features of the background noise, proceeding to step (4) in a case that the amplitude-frequency features of the background noise meet a requirement, and proceeding to step (1) for inspection in a case that the amplitude-frequency features of the background noise do not meet a requirement;

step (4), powering on the signal driving apparatus to drive the six-degree-of-freedom microvibration simulator to perform disturbance driving with different amplitudes in a range of 0 kHz to 1 kHz, and performing data acquisition and storage by the data acquisition and processing system, wherein the data acquisition frequency is not less than 5 kHz, and an acquisition time of each segment of steady-state data is not less than 60 seconds, at least 10 segments of steady-state data are collected, and the space pointing measurement apparatus to be tested is powered on and does not operate in a first test process;

step (5), analyzing the data collected in step (4), counting collected time-domain data, and performing FFT transformation to obtain frequency-domain data, analyzing the frequency-domain data, and obtaining an amplitude-frequency feature diagram of the data collected by the first acceleration sensor to the fifth acceleration sensor and the angular displacement sensor;

step (6), powering on the space pointing measurement apparatus to be tested to operate for imaging, and performing steps (4) and (5);

step (7), shutting down the space pointing measurement apparatus to be tested, and performing steps (4) and (5); and step (8), after test, stopping transmitting operation instructions to a to-be-tested object and a testing device, and then powering off the to-be-tested object and the testing device.

6. The device according to claim 1, wherein three-dimension first-order frequencies of the zero stiffness system are configured to be less than 0.05 Hz, and three-dimension first-order frequencies of the supporting system are configured to be not less than 2 Khz.

7. The measurement device according to claim 1, wherein the six-degree-of-freedom microvibration simulator has a six-degree-of-freedom decoupling capability, and is capable of driving an acceleration of a 0.001 g level in a range of 0 kHz to 1 kHz.

8. The device according to claim 1, wherein the air flotation system has an adjustable and stable air pressure for a long time, a surface of the air flotation system, connected to the supporting system, has a flatness better than 3 um, and the air flotation system has an air flotation stiffness better than 20 Hz.

9. The device according to claim 1, wherein the star simulator is connected and fixed with the air floating platform through a three-point positioning support structure, and positions of three points of the three-point positioning support structure are distributed axisymmetrically.

10. The device according to claim 1, wherein the space pointing measurement apparatus to be tested is a millisecond-level optical sensor.

* * * * *